June 22, 1937.  M. P. J. GUENOT  2,084,682
APPARATUS FOR INCORPORATING TO A STREAM OF FLUID
UNDER PRESSURE OTHER FLUID OR POWDERED BODIES
Filed Aug. 14, 1935  2 Sheets-Sheet 1
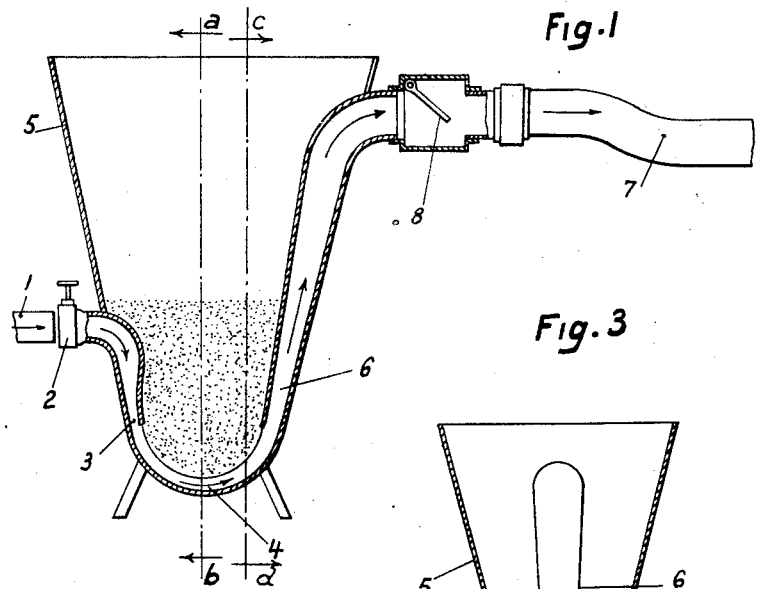
Fig.1
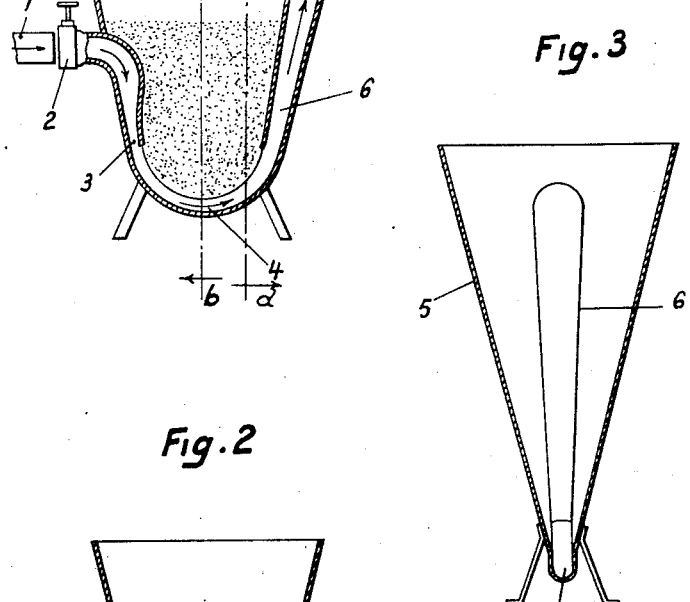
Fig.2
Fig.3
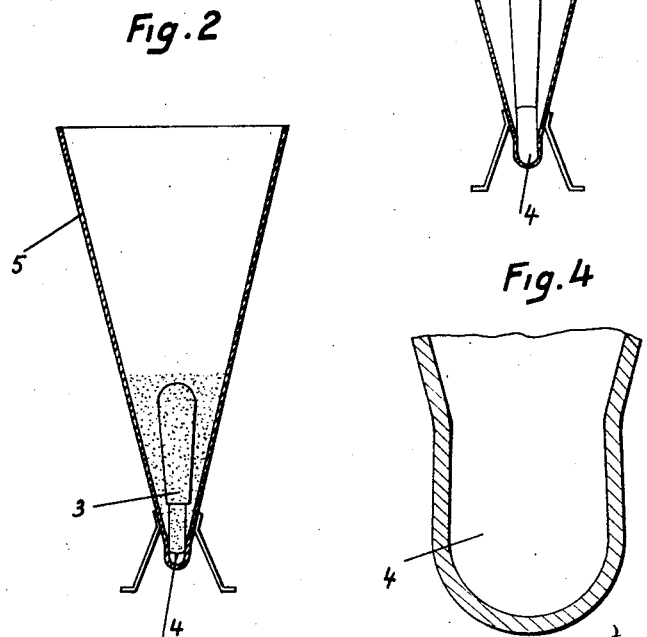
Fig.4

June 22, 1937.  M. P. J. GUENOT  2,084,682
APPARATUS FOR INCORPORATING TO A STREAM OF FLUID
UNDER PRESSURE OTHER FLUID OR POWDERED BODIES
Filed Aug. 14, 1935  2 Sheets-Sheet 2
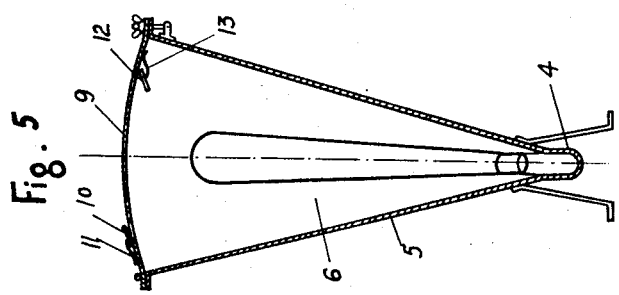
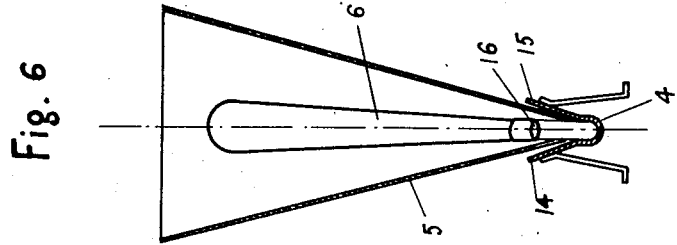

Patented June 22, 1937

2,084,682

UNITED STATES PATENT OFFICE 2,084,682

APPARATUS FOR INCORPORATING TO A STREAM OF FLUID UNDER PRESSURE OTHER FLUID OR POWDERED BODIES

Maurice Pierre Joseph Guenot, Montreuil, France

Application August 14, 1935, Serial No. 36,130
In France August 18, 1934

5 Claims. (Cl. 169—15)

It has been known since a long time to use for fire-extinction foam termed chemical foam produced by incorporating to a stream of water a powder formed of bodies producing in solution a strong out-flow of gas, or by mixing together several solutions, each of which is produced by incorporating to water a suitable chemical powder.

This invention relates to a device for performing such incorporation, and generally speaking for incorporating to a stream of fluid other fluid or powdered bodies with a higher density than that of said fluid.

In the chemical foam apparatus the incorporation of a powder to a stream of water and a proper use of the produced foam are difficult.

All the apparatus of that type actually known belong to two different kinds.

The apparatus of the first kind comprise a container, which is hermetically closed when working, and which is filled with appropriate chemicals. This container is supplied with water under pressure through a piping provided with an interrupting member, and comprises a second piping for the outlet of the water charged with said chemical ingredients while passing through the container. The pressure at which the apparatus is fed has to be strong enough to overcome all the losses of pressure in the container and the outlet piping, and to discharge the final product under a determined pressure through appropriate fire-hose or nozzles.

This kind of apparatus discloses the drawback that its working is essentially intermittent; as soon as the chemical powder stored in the container is used up, the inflow of water has to be stopped, the container opened, the water remaining therein emptied, fresh powder charged and the container closed, before the apparatus can start working again.

In the second known kind of apparatus, the chemical ingredients are sucked up by the stream of water, to which they are to be incorporated; for that purpose these apparatus comprise an injector fed with water under pressure and provided with an ejector nozzle discharging a free jet into a concentric widening piping, the cross section of which is greater than that of the jet, and which is connected with the outlet conduit-pipe. Said injector is located in a suction chamber supplied with chemical powder in a known manner through a hopper.

It is known that in such apparatus the pressure in the suction chamber and inside the free jet is beneath atmospheric pressure, so that the product coming through the feeding hopper is continually sucked up and mixed with the stream of water, the efficiency of the injector growing with the produced depression. This device, which works by suction, discloses however the following drawbacks:

1. When the product to be incorporated is in powdered or granular form, it does not provide an air-tight mass, so that air is sucked up together with the powder, the efficiency of the injector as regards the quantity of incorporated powder being thus reduced.

2. Let H be the difference between the feeding pressure and that inside the free jet of the injector; the speed of the water at its discharge from the ejector nozzle is then provided by the relation:

$$V_e = \sqrt{2gH}$$

where $g$ is the acceleration due to gravity. On the other hand, if V is the speed of the water in the widened portion of the injector, i. e. in the widened receiving nozzle, and $m$ the mass of water flow per second, it is known that the unrecoverable losses of energy due to the sudden change of cross-section, are given by the relation $$p = \frac{m(V_e - V)^2}{2g}$$

Owing to the depression inside the free jet, the value of H and therefore that of $V_e$ is high, so that consequently the losses $p$ are also high.

The apparatus for effecting the incorporation according to this invention permits the elimination of this drawback, and it consists in sending the jet of fluid under pressure through a curvilinear trajectory with a relatively short radius of curvature, and in causing the particles of the product to be incorporated into said jet; the centrifugal force communicated to said particles being caused by their contact with the concave surface of the structure.

In the apparatus according to this invention, the supply-pipe of fluid under pressure comprises a curved channel open on its inner concave side, and the product to be incorporated is located in a container communicating with the free inner concave surface of the jet in said channel.

The particles of the product to be incorporated which come into contact with the inner concave surface of the jet of fluid, acquire by friction a velocity directed tangentially to said curvilinear trajectory, so that they are subjected to the action of a centrifugal force which, as these particles have a higher density than the fluid, forces them to penetrate inside the fluid vein.

On the other hand, as the trajectory of the jet is curvilinear, the molecules of the fluid are themselves subjected to a strong centrifugal action, which applies them against the wall of the channel; the result is that the threads of fluid adjacent to the free surface of the jet are subjected to a pressure equal to atmospheric pressure, while inside said jet, the pressure on the threads grows with their proximity to the wall of the channel. In such circumstances, the difference H between the feeding pressure and that existing at the place where the driving away of the product is performed, is considerably smaller than in the known injector apparatus described, so that the unrecoverable losses of energy, which depend on the value of H are also considerably reduced.

On the other hand, if the density of the fluid is greater than that of air, such as is the case of water, no air will be incorporated thereto, as the centrifugal force applied to the molecules of air will be too weak to force them to penetrate into the compressed fluid.

It is therefore apparent that this invention is based on a totally different principle than that of the known methods and apparatus, as instead of producing the incorporation by suction in a fluid under a pressure below atmospheric pressure, the product incorporated according to this invention in the fluid is subjected to a pressure exceeding atmospheric pressure and by means of centrifugal force.

Three embodiments of this invention are hereinafter described, and illustrated in the accompanying drawings, in which:

Fig. 1 is a vertical longitudinal sectional view of one embodiment;

Fig. 2 is a cross-section along line a—b of Fig. 1, looking in the direction of the arrows;

Figure 3 is a section taken along the line of c—d in Figure 1, and looking in the direction of the arrows;

Fig. 4 is an enlarged, fragmentary cross-sectional view of the concave channel of the apparatus;

Fig. 5 is a central sectional view of an embodiment, termed accumulator, and

Fig. 6 is a central sectional view of another embodiment.

The fluid subjected to a pressure provided by any means, such as a pump, a container, gas pressure, an elevated container, etc., is supplied to the apparatus through a suitable conduit-pipe 1, such as a metal tube, flexible piping, etc., provided with a valve 2. The fluid passes through a pipe 3 into an open curved channel 4, (which is shown in cross-section in Fig. 4), and then to outlet pipe 6.

A container 5, for instance in the form of a hopper, is above the channel 4, and it receives the product to be incorporated into the fluid stream. In the embodiment shown in Figures 1 to 5, the lateral walls of the hopper 5 are a continuation of the lateral walls of the channel 4.

The product to be incorporated is put into container 5 and comes in contact with the surface of the fluid stream in the channel 4, the particles or molecules of the product which are in contact with the moving surface of the fluid acquire through friction a certain velocity, and their trajectory being curved, they are subjected to the influence of the centrifugal force, which forces them to penetrate into the stream of fluid, while tending to bring them as near as possible to the walls of the channel 4.

The mixture thus formed is received by the receiving piping 6 with growing cross-section, adapted to reduce the speed of the mixture, and therefore to transform a portion of its kinetic energy into potential energy.

At the outlet of the receiving piping, the mixture is then received by a conduit pipe 7, such as a metal flexible or like tube, and passes to the place of use, where it may be discharged through various kinds of nozzles, ensuring its discharge either in full flow at reduced speed, or in full jet at an accelerated speed (fire-hose), or finally in pulverized state.

A check-valve 8 is placed at the outlet of the receiving pipe for the purpose of obviating the return of the mixture into the apparatus, when the supply of the fluid is cut off by closing the interrupting member 2.

The embodiment illustrated in Fig. 5 is similar to the embodiment of Figs. 1 to 4, in that the channel 4 forms the lower portion of the hopper 5. It comprises moreover a removable lid 9, which may be tightly fitted on the hopper 5. Thus when the apparatus is set into position in advance and filled with powder, so as to start working automatically when fire arises, the powder is not impaired by the action of external agents. The lid 9 is provided however with a valve 10 kept normally closed by means of a spring 11, and which may open to allow the exhaust into the atmosphere of gases which may be produced by slow decomposition of the powder. A valve 12 is adapted to open in an opposite direction to the valve 10, and maintained normally closed by means of a spring 13 against the inner surface of the lid 9, allows air to enter into the hopper when vacuum is produced therein by the lowering of the mass of the product to be incorporated.

In the embodiment shown in Fig. 5 the walls of the container receiving the product to be incorporated are formed by the continuously produced walls of the channel guiding the stream of a fluid, such as water. This arrangement may disclose however a draw-back in the case where the resistance of the discharge piping to the passing of the mixture formed in the apparatus renders the emptying of the channel slower than its filling.

A portion of the fluid supplied to the channel would in that case be prevented from penetrating into the piping 6 and would be collected in the hopper 5, pushing thus the product to be incorporated upwards. A means for eliminating this draw-back is shown in the embodiment of the apparatus illustrated in Fig. 6.

In that embodiment the upper edges 14 and 15 of the curved channel 4 between the opening of the supply pipe not illustrated in the drawings and the edge 16 of the discharge pipe 6 are produced to certain height while deviating from one another. The walls of the hopper 5 in that portion of the apparatus instead of being integral with the edges 15 and 16, are produced inside the latter to a small height without contacting with same, so as to provide a slot on each side. It is readily apparent that when the level of the fluid in the channel 4 is raised, the water will flow out through the lateral slots forming overflow heads and will not rise in the hopper.

What I claim is:

1. A device for incorporating a powder to a stream of liquid under pressure, comprising a curved conduit of substantial curvature having an elongated opening in its inner side, means for supplying powder into said opening by gravity, means for supplying liquid under pressure to said conduit, and an outlet for said conduit.

2. A device for incorporating a powder to a stream of liquid under pressure, comprising a curved conduit of substantial curvature, said conduit being arranged to present upper and lower portions and being open on its upper concave portion, a powder-container with apertured bottom disposed above said open conduit and arranged to discharge into said opening, and inlet and outlet means connected to the ends of said conduit.

3. A device for incorporating a powder to a stream of liquid under pressure, comprising a powder-container provided with a curved channel-like bottom of substantial curvature said channel being open on its inner concave side, and inlet and outlet pipes connected to said container at the ends of said curved channel-like bottom.

4. A device for incorporating a powder to a stream of liquid under pressure, comprising a powder-container provided with a curved channel-like bottom of substantial curvature said channel being open on its inner concave side, inlet and outlet pipes connected to said container at the ends of said curved channel-like bottom, a tight lid on said container, and said lid provided with a suction valve and an exhaust valve.

5. A device for incorporating a powder to a stream of liquid under pressure, comprising a curved conduit of substantial curvature, said conduit being open on its concave portion, a hopper-like powder-container having its lower edges located inside the open curved conduit without contact with said conduit, and inlet and outlet pipes connected to the ends of said conduit.

MAURICE PIERRE JOSEPH GUENOT.